Nov. 11, 1924.　　　　　　　　　　　　　　　1,515,453

T. A. WILLARD

STORAGE BATTERY

Filed March 10, 1922

Inventor
Theodore A. Willard
by
Thurston Kwis & Hudson
attys.

Patented Nov. 11, 1924.

1,515,453

UNITED STATES PATENT OFFICE.

THEODORE A. WILLARD, OF CLEVELAND HEIGHTS, OHIO, ASSIGNOR TO WILLARD STORAGE BATTERY COMPANY, OF CLEVELAND, OHIO, A CORPORATION OF WEST VIRGINIA.

STORAGE BATTERY.

Application filed March 10, 1922. Serial No. 542,597.

*To all whom it may concern:*

Be it known that I, THEODORE A. WILLARD, a citizen of the United States, residing at Cleveland Heights, in the county of Cuyahoga and State of Ohio, have invented a certain new and useful Improvement in Storage Batteries, of which the following is a full, clear, and exact description.

This invention relates to a storage battery and has for its chief object to provide a battery wherein compactness is an important characteristic, and which is so constructed that liability of leakage of current between cells is minimized.

The present battery is designed especially for radio work wherein a large number of cells are adapted to be grouped together so that it is desirable that the cells occupy as little space as possible, and as the batteries designed for this purpose may be of small ampere hour capacity, the prevention of leakage of current is a matter of considerable importance. Likewise it is desirable that the parts be capable of rapid assembly and that the cell be inexpensive to produce.

These desirable features are attained by my invention which may be briefly summarized as consisting in certain novel details of construction, and combinations and arrangements of parts which will be described in the specification and set forth in the appended claims.

Figure 1:
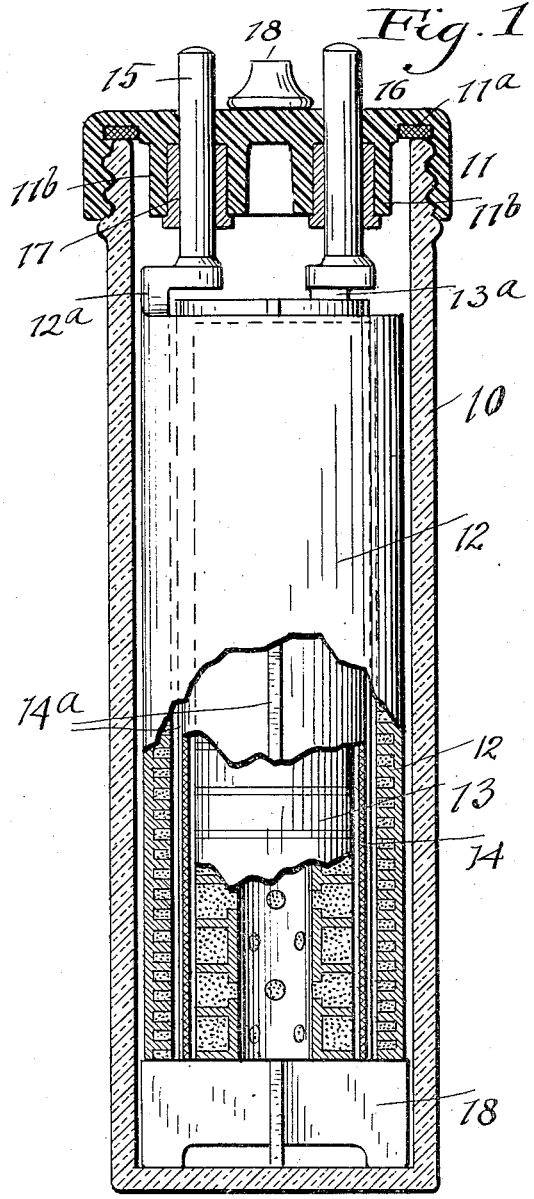
Figure 2:
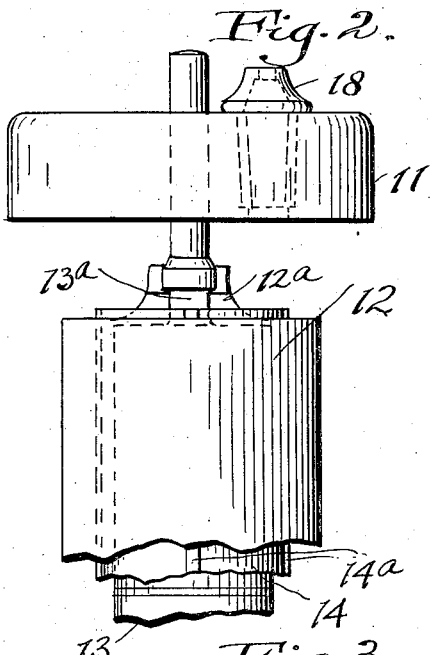
Figure 3:
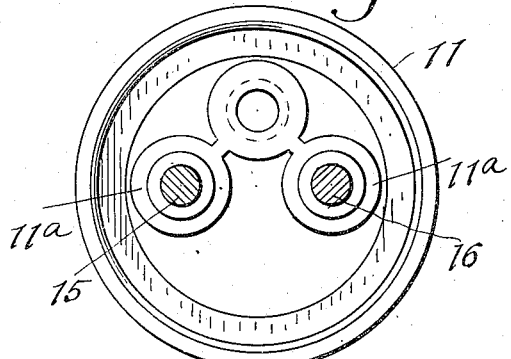
Figure 4:
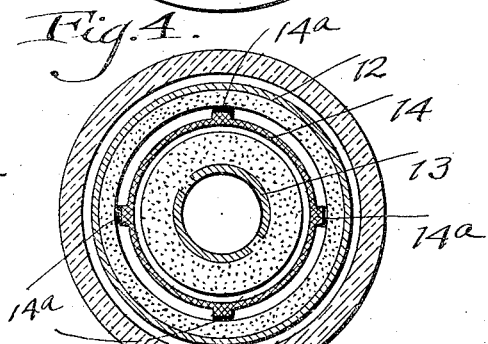
Figure 5:
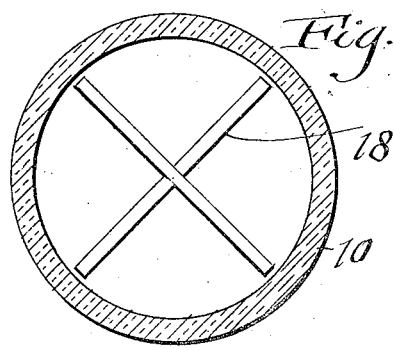

In the accompanying sheets of drawings wherein I have shown the preferred embodiment of my invention. Fig. 1 is a vertical sectional view of the battery cell embodying my invention, parts being broken away: Fig. 2 is an elevation showing the cover and the upper portions of the battery elements with the body of the receptacle removed: Fig. 3 is a bottom view of the cover; Fig. 4 is a transverse sectional view taken through the cell; and Fig. 5 is a similar view taken through the lower part beneath the battery elements.

It will be observed that the cell here shown includes a cylindrical receptacle which may be formed of any suitable insulating material such as glass. Preferably the top of the container is threaded so as to receive a threaded cover 11 also of insulating material such as hard rubber. Inside the cover, near its margin, there is a gasket 11ª which is tightly compressed against the top of the container when the cover is screwed into place. This eliminates the necessity of the usual sealing material to seal the covers to prevent leakage of electrolyte.

In this instance there is one positive and one negative element arranged co-axially in the receptacle and both are of cylindrical form, the positive element being shown at 12 and the negative element at 13. The positive element includes a body of lead which is hollow and tubular and is flanged on its interior to receive the active material. The negative element which is located inside the positive element, includes a body of lead which is preferably flanged exteriorly to hold the active material. This body of lead may be solid or tubular, but as here shown has a hollow center or is tubular and if desired, the tubular body may be provided here and there with transverse perforations to increase the circulation.

Between the positive and negative elements 12 and 13 I provide a tubular separator 14 which is preferably of the thread rubber type, such as covered by my prior Patents, Nos. 1,243,368, 1,243,369, 1,243,370 and 1,243,371. This separator is preferably provided on the exterior with spaced ribs 14ª to hold the positive and negative elements a predetermined distance apart. These tubular separators may be formed in the manner explained in my Patent No. 1,243,371, in which event a series of the separator tubes will be formed in a unit by pressing a pair of thread rubber sheets against cylindrical mandrels in a mold and squeezing the sheets together between the mandrels, and also beyond the endmost. Then by separating the tubes by cutting through the webs which join them, a pair of diametrically opposite ribs are formed on each tubular separator so that it will only be necessary to apply a pair of other external ribs if more than two are desired.

Both tubular elements 12 and 13 are provided at the top with lugs 12ª and 13ª, and these lugs have upstanding positive and negative terminals 15 and 16 Preferably these terminals are forced through relatively soft rubber bushings 17 fitted tightly in bosses 11ᵇ on the under side of the cover whereby leakage is prevented along the terminals. To one side of the center line between the two terminals where they project through the cover, the latter is pref erably provided with a vent plug 18. With this construction the positive and negative elements turn with the cover 11 when the latter is screwed down tightly so as to cause its gasket to be tightly squeezed against the top of the container.

At the bottom of the container there may be provided a suitable insulating support 18 on which the elements, and particularly the separator may rest.

Having described my invention, I claim:

1. A storage battery cell comprising a container of insulating material having a threaded top portion, a cover adapted to be screwed thereon and positive and negative elements within the container having terminals extending through the cover and fitted tightly therein, said positive and negative elements being rotatable with the cover to permit the cover to be screwed upon the container.

2. A storage battery cell comprising a container of insulating material, a detachable cover for the top of the container adapted to be secured to or freed from the container by a rotative movement with respect thereto, co-axial positive and negative elements of cylindrical form within the container, and a tubular separator between them, said elements having terminals projecting up through the cover, said positive and negative elements being rotatable with the cover to permit the cover to be secured to or detached from the container.

3. A storage battery cell comprising a cylindrical container of insulating material having a cover screwed onto the top thereof, cylindrical positive and negative elements with the container and one arranged inside the other, and a tubular separator between said elements, the elements having terminals projecting up through the cover, said positive and negative elements being rotatable with the cover to permit the cover to be screwed upon the container.

4. A storage battery cell comprising a container of insulating material having a threaded top portion, a cover adapted to be screwed thereon and provided with relatively soft terminal sealing portions, and positive and negative elements within the container having terminals extending through the cover and fitted tightly in said terminal sealing portions, said positive and negative elements being rotatable with the cover to permit the cover to be screwed upon the container.

5. A storage battery cell comprising a container of insulating material having a threaded top portion, a cover adapted to be screwed thereon and provided with openings receiving relatively soft bushings, and positive and negative elements within the container having terminals extending through said openings and tightly fitted in said bushings, said positive and negative elements being rotatable with the cover to permit the cover to be screwed onto and off the container.

6. A storage battery cell comprising a container of insulating material having a threaded top portion, a cover adapted to be screwed onto the container with a gasket seal between it and the container and provided with openings for terminals, relatively soft rubber terminal sealing members extending into the openings, and positive and negative elements within the container and provided with terminals extending through said sealing members and the openings of said cover and rotatable with the latter as it is screwed onto and off the container.

In testimony whereof, I hereunto affix my signature.

THEODORE A. WILLARD.